United States Patent [19]

Pope

[11] Patent Number: 4,916,892

[45] Date of Patent: Apr. 17, 1990

[54] HIGH PRESSURE SEAL

[75] Inventor: Adam N. Pope, Cincinnati, Ohio

[73] Assignee: General Electric Company, Cincinnati, Ohio

[21] Appl. No.: 190,970

[22] Filed: May 6, 1988

[51] Int. Cl.[4] .............................................. F02C 3/067
[52] U.S. Cl. .................................. 60/39.02; 60/39.162; 60/39.32; 416/129; 415/113; 277/74; 277/75; 277/96.1
[58] Field of Search .................. 60/39.162, 268, 39.32, 60/39.02; 416/129, 171, 173; 415/113, 110; 277/74, 75, 96.1, 93 SD, 93 R, 87, 85, 81 R

[56] References Cited

U.S. PATENT DOCUMENTS

| | | | |
|---|---|---|---|
| 2,587,326 | 2/1952 | Islip et al. | 415/113 |
| 2,598,176 | 5/1952 | Johnstone | 415/113 |
| 3,347,553 | 10/1967 | Schweiger | 277/74 |
| 3,363,419 | 1/1968 | Wilde | 60/268 |
| 3,383,033 | 5/1968 | Moore | 415/113 |
| 3,462,159 | 8/1969 | Baumann et al. | 277/27 |
| 3,529,906 | 9/1970 | McLaurin et al. | 415/113 |
| 3,572,727 | 3/1971 | Greiner | 277/74 |
| 3,623,736 | 11/1971 | Petrie et al. | 415/113 |
| 3,663,119 | 5/1972 | Brooking et al. | 416/157 |
| 3,673,802 | 7/1972 | Krebs et al. | 60/268 |
| 3,743,303 | 7/1973 | Pope | 277/27 |
| 3,811,791 | 5/1974 | Cotton | 60/268 |
| 3,908,361 | 9/1975 | Gardiner | 415/113 |
| 4,199,152 | 4/1980 | Catterfield | 277/3 |
| 4,289,264 | 9/1981 | Rawlins | 277/27 |
| 4,639,000 | 1/1987 | Warner | 277/41 |
| 4,706,966 | 11/1987 | Lind | 277/75 |

Primary Examiner—Donald E. Stout
Attorney, Agent, or Firm—Jerome C. Squillaro; Nathan D. Herkamp

[57] ABSTRACT

In a gas turbine engine including first and second differentially rotating members coaxial with each other, a low pressure region disposed about the first and second differentially rotating members, and an annular gas flowpath disposed within the first and second differentially rotating members defining a high pressure region, a method and apparatus for preventing fluid leakage between the first and second rotating members. An annular carrier is coupled to the first rotating members such that the annular carrier is coaxial with the first rotating member. The annular carrier is sandwiched between a first race and a second race with the first and second races coupled to the second rotating member. The second race is urged toward the first race such that leakage of a fluid from the high pressure region to the low pressure region is not substantially increased by frictional wear of any of the annular carrier, first race and second race.

31 Claims, 5 Drawing Sheets

HIGH PRESSURE SEAL

The government has rights in this invention pursuant to contract no. F33657-81-C-2006 awarded by Department of the Air Force

FIELD OF THE INVENTION

This invention relates generally to high pressure seals, and more particularly, to high pressure seals for use with differentially rotating components in gas turbine engines.

BACKGROUND OF THE INVENTION

There are many applications which require high pressure seals at an interface between adjacent differentially rotating components. In most of such applications, the differentially rotating components are coaxial with each other and have an internal fluid passageway disposed within the components. A fluid pressure differential exists between the internal fluid passageway and a region external of the differentially rotating components whereby high pressure seals are required at an interface between the components to prevent leakage of fluid between the components. If relative rotation is slow, a rubbing type seal can be held firmly against the rotating surface and is generally effective to maintain a sealing relationship, although wear and subsequent leakage are common. If, however, the relative velocity of rotation between the components is high, rubbing type seals erode too quickly and are generally ineffective and impractical in such applications.

One application in which high speed differential rotation occurs is in gas turbine engines of the type used in present day aircraft. By "differential rotation" it is meant that one apparatus rotates with respect to an adjacent apparatus. Such may occur, for example, between a stationary member and a rotating member. By way of explanation, gas turbine engines generally include a gas generator which comprises a compressor for compressing air flowing aft through the engine, a combustor in which fuel is mixed with the compressed air and ignited to form a high pressure/high temperature gas stream, and a turbine driven by the gas stream and connected for driving a rotor which in turn drives the compressor. Many engines further include a second turbine, known as a power turbine, located aft of the gas generator and which extracts energy from the gas flow to drive a rotating load such as found in the propulsor of ducted turbo-fan engines, and turbo-prop engines.

A recent improvement over the turbo-fan and and turbo-prop engine is the unducted fan engine such as disclosed in U.S. patent application Ser. No. 437,923—Johnston, filed Nov. 1, 1982, now abandoned. In the unducted fan engine, the power turbine includes counterrotating rotors and turbine blades which drive counterrotating unducted fan blades or propellers radially located with respect to the power turbine. The high pressure gas stream flows from the combustor, through a stationary duct and then through the rotors. A high pressure seal is required at the interface between the stationary duct and the adjacent rotor to prevent leakage of the high pressure gas stream.

One high pressure seal used in the past with differentially rotating members includes a forward race, an aft race, and an annular carrier. The forward race and aft race are fixedly coupled to the stationary member with an annular channel coaxial with the stationary member being defined between the forward race and the aft race. The annular carrier is coupled to the rotating member and is dimensioned to fit within the annular channel. As the rotating member rotates with respect to the stationary member, the annular carrier and races act as a low friction seal. Additionally, a small amount of leakage is permitted at the interfaces between the carrier and the races. This leakage reduces friction and subsequent wear. It is believed that one of the disadvantages of such prior art high pressure seals is excessive leakage caused by excess wear of the races and annular carrier. Any wear of the races and/or the carrier increases the gaps between the races and the carrier. An increase in the size of the gaps between the races and the carrier results in an increase in fluid leakage and, consequently, a loss in pressure. It is believed that a decrease in fluid pressure in the turbine section of a gas turbine engine reduces the efficiency of the engine.

SUMMARY OF THE INVENTION

Among the objects of the present invention is the provision of an improved method and apparatus for preventing leakage between differentially rotating members which overcomes the above discussed disadvantageous or undesirable features, as well as others, of the prior art. It is another object of the present invention to provide a seal in which leakage through the seal is not substantially increased by frictional wear of the seal. These, as well as other features, objects, and advantages of the present invention will be in part apparent and in part pointed out hereinafter.

In one embodiment, the present invention is directed to a high pressure seal used in a system for reducing leakage between differentially rotating members. The system includes first and second differentially rotating members coaxial with each other. An internal fluid passageway is disposed within the first and second rotating members and a fluid pressure differential exists between the internal fluid passageway and a region external of the first and second rotating members. The seal includes an annular carrier coaxial with and coupled to the first rotating member, first and second races sandwiching the annular carrier and coupled to the second rotating member, and a mechanism for urging the second race toward the first race. A first low friction interface being defined between the first race and the annular carrier and a second low friction interface being defined between the second race and the annular carrier. The annular carrier is differentially rotatable with respect to the races. Preferably, apertures are provided adjacent to the first and second interfaces for creating a first hydrostatic film between the annular carrier and the first race and a second hydrostatic film between the annular carrier and the second race.

BRIEF DESCRIPTION OF THE DRAWINGS

The present invention is illustrated by way of example in the figures of the accompanying drawings in which.

Corresponding reference characters indicate corresponding parts throughout the several views of the drawings.

The exemplifications set out herein illustrate the preferred embodiments of the present invention in one form thereof, and such exemplifications are not to be construed as limiting either the scope of the invention or the scope of the disclosure thereof in any manner.

DETAILED DESCRIPTION

Figure 1:
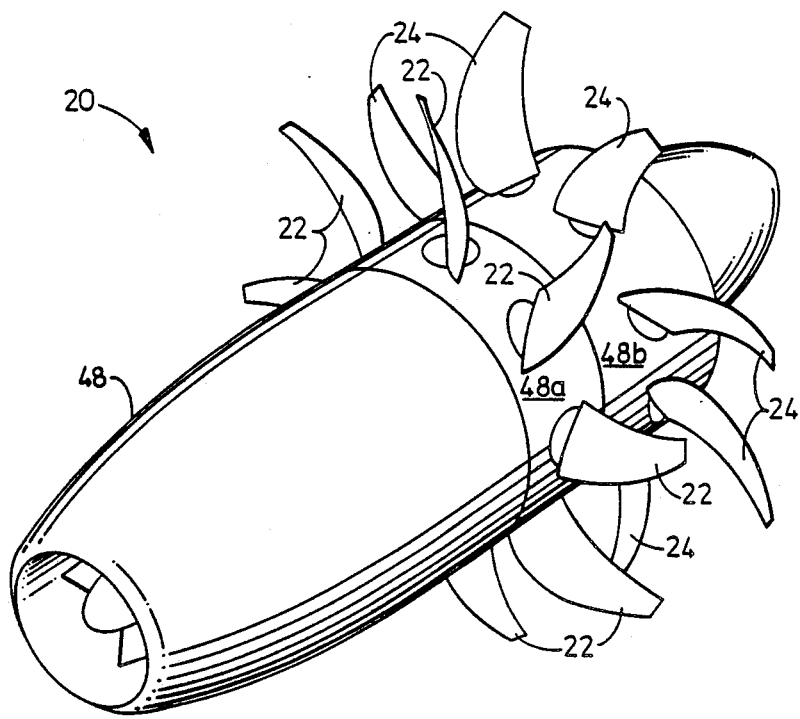
FIG. 1 illustrates a perspective view of an unducted fan type gas-turbine engine.
Figure 2:
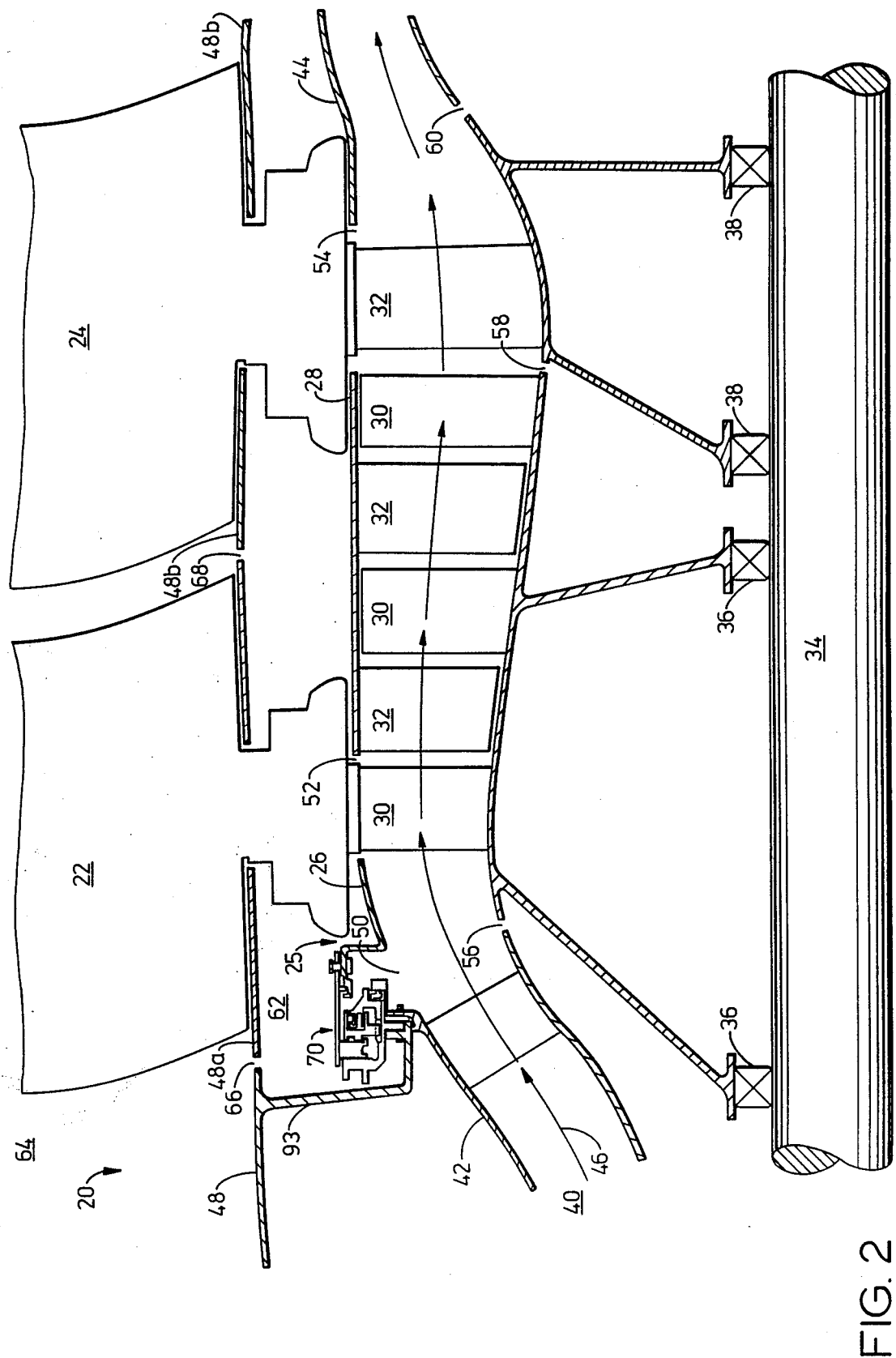
FIG. 2 illustrates a side elevation view, in section, of a turbine section of the unducted fan type gas-turbine engine.

FIGS. 1 and 2 illustrate an unducted fan (UDF) jet engine 20 having forward and aft counterrotating fans or propellers 22 and 24 disposed radially outwardly of a power turbine 25. The power turbine includes first and second counterrotating rotors 26 and 28 and first and second counterrotating turbine blades 30 and 32 coupled to the first and second rotors 26 and 28, respectively. The forward and aft propellers 22 and 24 are respectively coupled to the first and second rotors 26 and 28 and rotate therewith. The first and second rotors 26 and 28 are disposed about a stationary shaft 34 and are rotatably coupled to the shaft 34 by first and second corresponding bearings 36 and 38. An outer shroud or nacelle 48 encompasses the rotors 26 and 28 with the propellers 22 and 24 disposed radially outwardly of the nacelle 48. The nacelle 48 includes a first sleeve 48a which is coupled to and rotating with the forward propeller 22, and a second sleeve 48b coupled to and rotating with the aft propeller 24. The purpose of the nacelle 48 is to provide the proper air flow characteristics to optimize the performance of the propellers 22 and 24. The engine 20 further includes an annular gas flowpath 40 formed through the first and second rotors 26 and 28, a first stationary duct 42 forward of the first rotor 26, and a second stationary duct 44 aft of the second rotor 28. Air passing through the gas flowpath 40 is compressed and heated to form a high energy (high pressure/high temperature) gas stream, denoted generally by arrow 46. The high energy gas stream 46 flows from the first duct 42 through the first and second rotors 26 and 28 to turn the counterrotating turbine blades 30 and 32 to drive the counterrotating propellers 22 and 24, respectively.

A low pressure region 62 is defined between the nacelle 48 and the power turbine 25. The low pressure region 62 communicates with atmosphere, denoted generally by numeral 64, by way of a first vent 66 defined between the forward portion of the nacelle 48 and the first sleeve 48a, and a second vent 68 defined between the first sleeve 48a and the second sleeve 48b. Since the low pressure region 62 communicates with atmosphere 64, the fluid pressure in the low pressure region 62 is essentially atmospheric pressure. Since the pressure in the gas flowpath 40 caused by the gas stream 46 is higher than the pressure in the low pressure region 62, a fluid pressure differential exists between the gas stream 46 and the low pressure region 62. Any gaps or fluid passageways between the gas flowpath 40 and the low pressure region 62 result in leakage of the gas stream 46 and, consequently, a decrease in pressure in the gas flowpath 40. A decrease in pressure in the gas flowpath 40 reduces the overall performance of the engine 20.

Since the flowpath 40 is formed through differentially rotating members, i.e., the first duct 42, the first rotor 26, the second rotor 28 and the second duct 44, gaps exist at the outer rotating boundaries between the differentially rotating members. The outer rotating boundaries are defined as: a first differentially rotating boundary 50 between the first duct 42 and the first rotor 26; a second differentially rotating boundary 52 between the first rotor 26 and the second rotor 28; and a third differentially rotating boundary 54 between the second rotor 28 and the second duct 44. Any leakage through these outer rotating boundaries reduces the effectiveness of the engine. Therefore, high pressure seals are needed at the outer rotating boundaries to prevent such a pressure drop. Additionally, first, second and third inner rotating boundaries 56, 58 and 60 are defined between the first duct 42 and the first rotor 26, first rotor 26 and second rotor 28, and second rotor 28 and second duct 44, respectively. Although the inner rotating boundaries 56, 58 and 60 are essentially gaps in the flowpath 40, no significant pressure drop in the flowpath 40 is caused by the inner rotating boundaries 56, 58 and 60 since they are completely encompassed by the flowpath 40 and not open to atmosphere 64.

Figure 3:
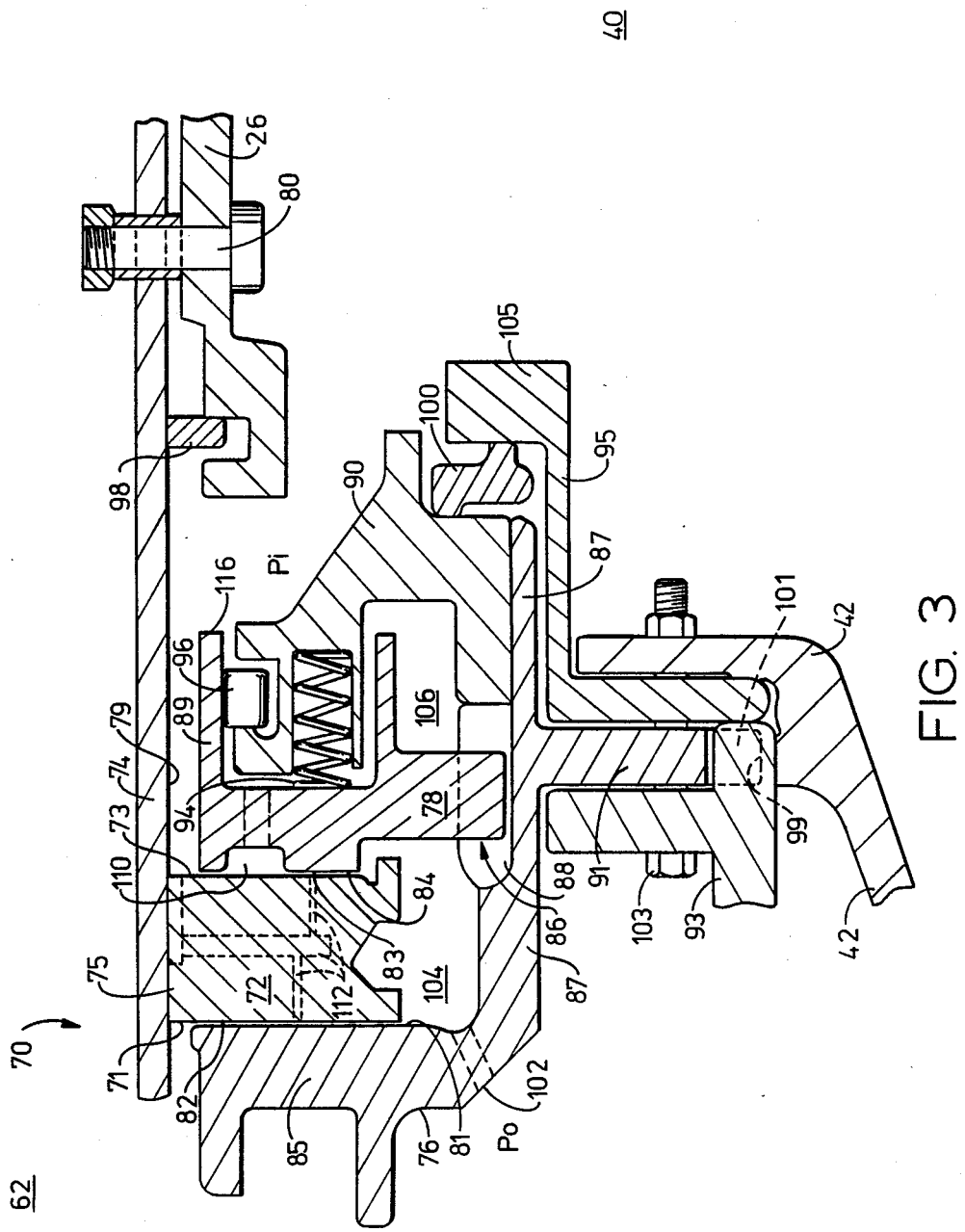
FIG. 3 illustrates a cross-section view of a high pressure gas seal in accordance with the present invention.

With reference to FIGS. 2 and 3 in general, there is illustrated in one form of the invention a method and apparatus for preventing significant leakage of the high energy gas stream 46 from the flowpath 40. A high pressure seal is provided at the first differentially rotating boundary 50 between the first duct 42 and the first rotor 26. For ease of discussion, only the high pressure seal 70 at the first rotating boundary 50 will be discussed. However, it will be understood that similar high pressure seals may be used at the second and third differentially rotating boundaries 52 and 54, respectively. The high pressure seal 70 of the present invention includes an annular low-friction carrier 72 coaxial with and coupled to the first rotor 26, forward and aft races 76 and 78 sandwiching the carrier 72 and coupled to the first duct 42 with a first low friction sliding interface 82 being defined between a forward face 71 of the carrier 72 and an aft face 81 of the forward race 76 and a second low friction sliding interface 84 being defined between an aft face 73 of the carrier 72 and a forward face 83 of the aft face 78, and a mechanism for urging the aft race 78 toward the forward race 76. Preferably the low-friction carrier 72 is formed of carbon and is hereinafter referred to as "carbon carrier 72" although other low-friction materials suitable for the disclosed environment may be substituted for carbon. In this arrangement, the carbon carrier 72 is differentially rotatable with respect to the forward and aft races 76 and 78. Additionally, as will be understood with a more detailed discussion below, gas cushioning films, more commonly known as hydrostatic films, are create at the first and second interfaces 82 and 84 for reducing friction and subsequent wear between the carbon carrier 72 and the races 76 and 78.

More particular reference is now made to FIG. 3 which illustrates, in detail, a cross-section view of the high pressure seal 70. The carbon carrier 72 is coupled to the first rotor 26 by way of an outer race 74 fixedly coupled to the first rotor 26. The outer race 74 is connected to the first rotor 26 by way of a plurality of sleeved bolts 80 or the like penetrating both the outer race 74 and the first rotor 26. The sleeved bolts 80 are rigidly fixed to the first rotor 26 but permit relatively free differential radial growth between the outer race 74 and the first rotor 26. A ring seal 98, which may be, for example a piston ring, is provided between the outer race 74 and first rotor 26 to prevent leakage of gas from the high pressure gas flowpath 40. The carbon carrier 72 has an outer face 75 frictionally attached to an inner face 79 of the outer race 74 to prevent leakage of gas therebetween. The frictional force between the carbon carrier 72 and outer race 74 is sufficient to cause the carbon carrier 72 to rotate with the outer race 74 and first rotor 26 yet small enough to permit axial displacement of the carbon carrier 72 with respect to the outer race 74 when subject to an axial force. Although the carbon carrier 72 is coupled to the first rotor 26 by the outer rotor 74 in this embodiment, it is to be understood that the carbon carrier 72 could be coupled directly to the first rotor 26.

The carbon carrier 72 is axially sandwiched between the forward race 76 and aft race 78. The forward race 76 has an upper portion 85 positioned forward of the carbon carrier 72 and a lower portion 87 extending axially aft and radially inward of the carbon carrier 72. The aft race 78 is provided with a plurality of female side fitting splines about its inside diameter dimensioned for receiving a plurality of male side fitting splines 88 protruding radially outwardly from the lower portion 87 of the forward race 76. The female splines 86 and male splines 88 permit the aft race 78 to slide axially about the forward race 76 while preventing differential circumferential rotation of the aft race 78 with respect to the forward race 76

A sliding ring carrier 90 is positioned aft of the aft race 78 and tightly fitted to the lower portion 87 of the forward race 85 to prevent differential radial eccentricity. A sliding ring seal 96 is biased radially against the upper portion of the aft race 78 and axially forward against the sliding ring carrier 90 by pressure forces acting on the sliding ring seal 96. A plurality of helical springs 94 are positioned longitudinally between the aft race 78 and the sliding ring carrier 90. The helical springs 94 urge the aft race 78 forward toward the upper portion 85 of the forward race 76. The sliding ring seal 96 is positioned radially between an upper portion 89 of the aft race 78 and the sliding ring carrier 90 for preventing leakage of the high pressure gas stream from the gas flowpath 40.

The forward race 76 further includes a radial extension 91 protruding radially inward of the lower portion 87 for coupling the forward race 76 to the first duct 42. The radial extension 91 of the forward race 76 is sandwiched between a nacelle support 93 and a spring seal support 95. The nacelle support 93 has a plurality of slots 99 dimensioned to receive a corresponding plurality of tabs 101 protruding radially inward from the radial extension 91. The tabs 101 and slots 99 prevent rotational movement of the nacelle support 93 with respect to the first duct 42 and permit relatively free differential radial growth between the radial extension 91 and the nacelle support 93. A plurality of bolts 103 connect the nacelle support 93, forward race 76, spring seal support 95, and first duct 42 together. An S-shaped spring seal 100 is positioned between the sliding ring carrier 90 and a radial extension 105 of the spring seal carrier 95 to prevent leakage of the high pressure gas stream therebetween.

Figure 4:
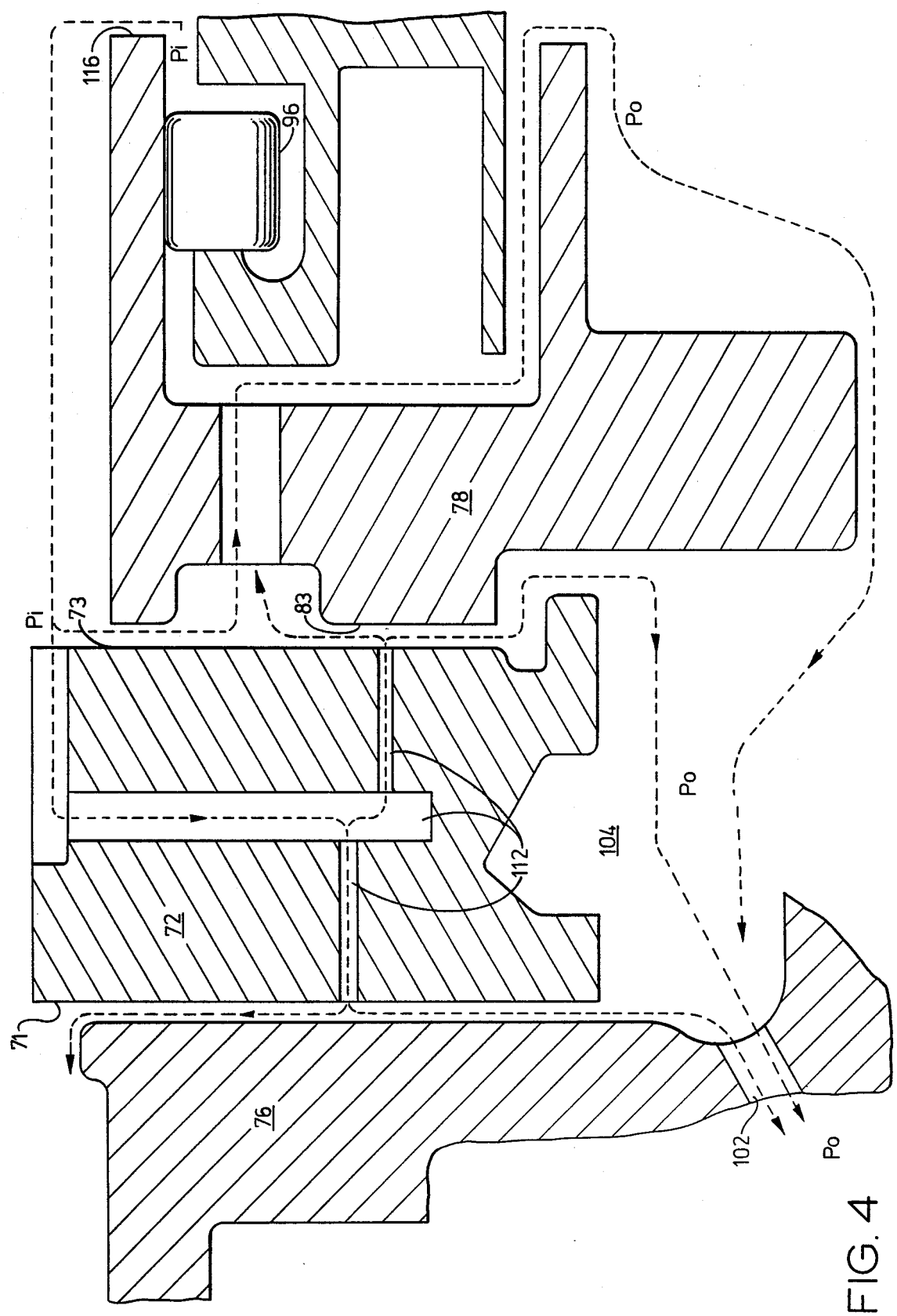
FIG. 4 is an exploded cross-section view of the high pressure gas seal of FIG. 2 illustrating the air flowpath and hydrostatic effect.

Reference is now made to FIGS. 3 and 4 which illustrate the formation of the hydrostatic films at the first and second interfaces 82 and 84. The high pressure seal 70 uses the pressure differential across the seal 70 to create the hydrostatic films. The pressure at the internal portion, or high pressure region, of the seal 70 will be denoted as $P_i$ whereas the pressure at the outer portion, or low pressure region, of the seal 70 will be denoted as $P_o$. Fluid passageways 112 are provided through the carbon carrier 72 such that the high pressure gas flowpath 40 communicates with the forward and aft faces 71 and 73 of the carbon carrier 72. Fluid passing through passageways 112 pushes against the forward and aft races 76 and 78 to form the hydrostatic films at the first and second interfaces 82 and 84 and to center the carbon carrier 72 within the channel formed between the forward race 76 and aft race 78. A plurality of apertures 102 are provided through the lower portion 87 of the forward race 76 so the low pressure region communicates with a first cavity 104 defined between the inner diameter of the carbon carrier 72 and the lower portion 87 of the forward race 76 such that the fluid pressure in the first cavity 104 is substantially equivalent to the pressure $P_o$ in the low pressure region. Having the fluid passageways 112 in the carbon carrier 72 communicating with the high pressure region $P_i$ and the first cavity 104 communicating with the low pressure region $P_o$ causes fluid to leak from the forward and aft faces 71 and 73 of the carbon carrier 72. This fluid leakage urges the aft race 78 axially away from the forward race 76. The size of the passageways 112 can be selected so that the fluid pressure where the passageways 112 communicate with the forward and aft faces 71 and 73 of the carbon carrier 72 is equal to or less than the fluid pressure $P_i$ in the high pressure region. The forces acting on the races 76 and 78 caused by the fluid leakage decreases as the gaps between the races 76 and 78 and carrier 72 increases since the fluid pressure in the interfaces decrease as the gaps are increased.

The fluid pressure differential across the seal 70 is also used for urging the aft race 78 toward the forward race 76. This is caused by having a pressure and springs 94 acting on the aft side of the aft race 78 with a greater force than the pressure acting on the forward face 83 of the aft race 78. Since the pressure acting on the forward face 83 of the aft race 78 is substantially atmospheric or $P_o$ when the clearance gap between the faces 73 and 83 are large, the pressure forces tending to urge the aft race 78 toward the forward race 76 is equal to the product of the high pressure $P_i$ and the radial area of the aft side of the aft race 78 against which the high pressure $P_i$ acts. That is to say, the pressure $P_i$ acting on the aft face 116 of the upper portion 89 of the aft race 78 helps urge the aft race 78 toward the forward race 76. Thus, the sum of the forces $F_t$ tending to urge the aft race 78 toward the forward race 76 is given by the equation:

$$F_t = F_s + (P_i - P_o)A_1$$

where $F_s$ is the spring force caused by the helical springs 94 and $A_1$ is the area of the aft face 116 of the upper portion 89 of the aft race 78. The forces from the gas leakage tending to urge the aft race 78 away from the forward race 76 and the forces $F_t$ tending to urge the aft race 78 toward the forward race 76 are selected to minimize both the friction and air leakage at the interfaces 82 and 84. Balancing the effects of friction an air leakage at the interfaces 82 and 84 is tantamount to selecting the gap sizes at the interfaces 82 and 84 since the balancing of the forces will provide constant gap sizes. Since the aft race 78 essentially floats between the counter urging forces, the gap sizes remain constant even if wear occurs between the carbon carrier 72 and races 76 and 78. For example, if wear were to occur at the forward face 71 of the carbon carrier 72, the gap at the first interface 82 would increase causing a decrease in force of the fluid pushing against the aft face 81 of the forward race 76 and, consequently, a force differential between the forward face 71 of the carbon carrier 72 and the forces $F_t$ urging the aft race 78 toward the forward race 76. This force differential would cause both the carbon carrier 72 and the aft race 78 to shift axially forward and toward the forward race 76. In this manner, the leakage rate and friction at the interfaces 82 and 84 remain constant even with the occurrence of wear. However, the carrier 72 will not slide with respect to the outer race 74 unless the friction forces therebetween are overcome.

Figure 5:
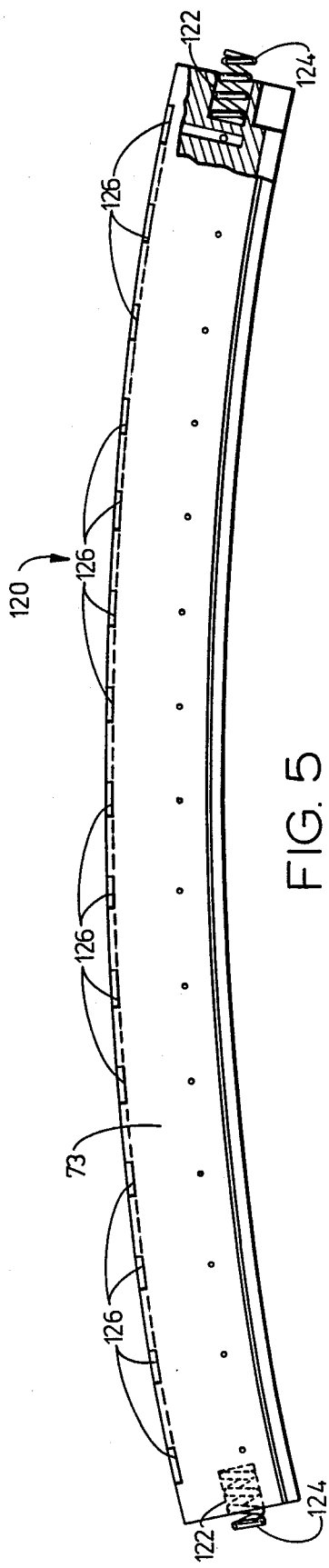
FIG. 5 illustrates a rear elevation view of a carbon carrier segment in accordance with the present invention.
Figure 6:
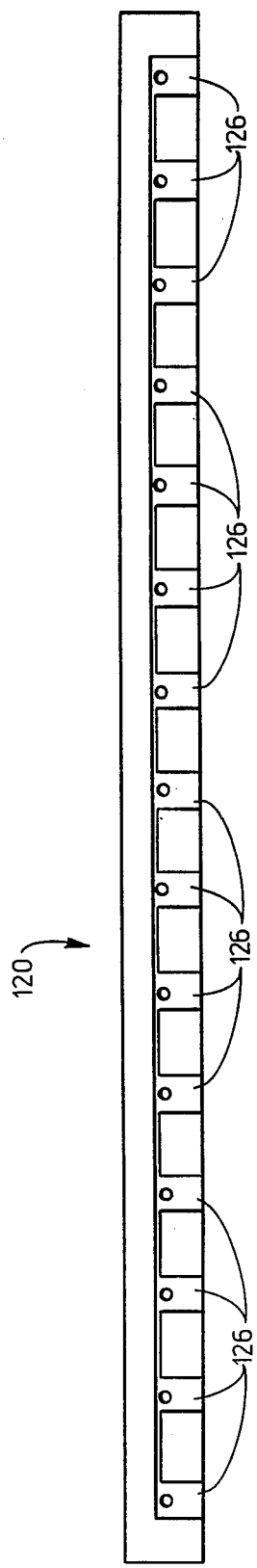
FIG. 6 illustrates a top view of a carbon carrier segment taken along the line 6—6 in FIG. 5.

For a better understanding of the friction forces between the carbon carrier 72 and the outer race 74, attention is directed to FIGS. 5 and 6 in conjunction with FIG. 3. The carbon carrier 72 comprises a plurality of arcuate segments 120, fifteen in the preferred embodiment with each extending through approximately twenty four degrees of arc. The end of each segment 120 is provided with an aperture 122 dimensioned for receiving corresponding springs 124, illustrated as helical springs in the exemplary embodiment. Other types of springs and other numbers of carrier segments may be used. The helical springs 124 urge the segments 120 away from each other and toward the outer race 74 to increase the normal force between the segments 120 and the outer race 74. The friction force $F_f$ is given by the equation:

$$F_f = \mu N,$$

where $\mu$ equals the coefficient of friction between the carrier 72 and the outer race 74 and N equals the normal force. The friction force $F_f$ must be sufficient to cause initial rotation of the carrier 72 as the first rotor 26 is initially rotated. As the carrier 72 is rotated, centrifugal forces act on each segment 120 to further increase the normal force and, consequently, the frictional force. To counteract the centrifugal forces, each segment is provided with a plurality of undercuts 126 on the outer diameter of each segment 120 such that the high pressure region communicates with the outer diameter of each segment and the pressure $P_i$ from the high pressure region is exerted radially inward. The pressure $P_1$ tends to urge each segment 120 radially inward and, consequently, reduce the normal force. The force urging each segment radially inward is proportional to the product of the area of each undercut 126 and the pressure $P_i$. Thus, the force urging each segment 120 radially inward and, consequently, the normal force N can be increased or decreased by increasing or decreasing the area of the undercuts 126. In this manner, the frictional force $F_f$ can be selected large enough so that the carrier 72 rotates with the first rotor 26, yet small enough so that the carrier 72 slides axially when subject to an axial force differential.

While the principles of the invention have now been made clear in an illustrative embodiment, it will become obvious to those skilled in the art, many modifications in structure, arrangement, portions and components used in the practice of the invention and otherwise which are particularly adapted for specific operating requirements without departing from those principles. Accordingly, it is intended that the description be interpreted as illustrative and not in a limiting sense and that the invention be given a scope commensurate with the appended claims.

I claim:

1. A gas turbine engine comprising:
   (a) a stationary member;
   (b) first and second rotating members coaxial with said stationary member;
   (c) an annular gas flowpath coaxial with said first and second rotating members and disposed within said stationary and first rotating member;
   (d) a plurality of first and second rotor blades fixedly coupled to said first and second rotating members, respectively, and extending into said flowpath whereby a high pressure gas stream flowing through said flowpath causes said first and second rotating members to counterrotate;
   (e) a plurality of first and second propulsor blades coupled to and disposed radially outward of said first and second rotating members, respectively;
   (f) an annular carrier coaxial with and coupled to said first rotating member;
   (g) first and second races sandwiching said annular carrier and coupled to said stationary member, a first interface being defined between a first surface of said first race and a first surface of said annular carrier and a second interface being defined between a first surface of said second race and a second surface of said annular carrier, said annular carrier being rotatable with respect to said races; and
   (h) means for urging said second race toward said first race such that leakage of the high pressure gas stream between said stationary member and said first rotating member is not substantially increased by frictional wear of any of said annular carrier, said first race and said second race.

2. The gas turbine engine of claim 1 wherein said urging means comprises a pressure differential across said second race caused by the high pressure gas stream communicating with said second race.

3. The gas turbine engine of claim 2 wherein said urging means further comprises at least one spring coupled to said second race, said spring exerting a force on said second race in a direction toward said first race.

4. The gas turbine of claim 1 wherein said urging means comprises at least one spring coupled to said second race, said spring exerting a force on said second race in a direction toward said first race.

5. The gas turbine engine of claim 1 further comprising means communicating with the first and second interfaces for creating first and second fluid films at the first and second interfaces respectively.

6. The gas turbine of claim 5 wherein said fluid film creating means comprises fluid pressure differentials across each of the interfaces.

7. The gas turbine engine of claim 6 wherein said fluid pressure differentials across the interfaces are formed by:
   (a) first fluid passageways through said carrier directing fluid from the high pressure gas stream to the first and second surfaces of said carrier; and
   (b) second fluid passageways coupling a fluid having a fluid pressure lower than the pressure of the gas stream to the first surface of said first race and the first surface of said second race.

8. In a gas turbine engine including first and second differentially rotating members coaxial with each other, a low pressure region disposed about the first and second differentially rotating members, an annular gas flowpath disposed within the first and second differentially rotating members defining a high pressure region, a seal to prevent substantial fluid leakage between the first and second rotating members comprising:
 (a) an annular carrier coaxial with and coupled to the first rotating member;
 (b) first and second races sandwiching said annular carrier and coupled to the second rotating member, a first low friction interface being defined between a surface of said first race and a first surface of said annular carrier and a second low friction interface being defined between a first surface of said second race and a second surface of said annular carrier, said annular carrier being differentially rotatable with respect to said races; and
 (c) means for urging said second race toward said first race such that leakage of a fluid from the high pressure region to the low pressure region is not substantially increased by frictional wear of any of said annular carrier, said first race and said second race.

9. The seal of claim 8 wherein said annular carrier is coupled to the first rotating member such that the annular carrier rotates with the first rotating member and the annular carrier is axially displaceable with respect to the first rotating member when subject to axially directed forces.

10. The seal of claim 8 wherein said urging means comprises a pressure differential across said second race caused by a fluid from the lower pressure region communicating with the first surface of said second race and a fluid from the higher pressure region communicating with a second surface of said second race which is opposite the first surface of said second race, whereby a force is exerted on said second race in a direction toward said first race.

11. The seal of claim 10 wherein said urging means further comprises at least one spring coupled to said second race, said spring exerting a force on said second race in a direction toward said first race.

12. The seal of claim 8 wherein said urging means comprises at least one spring coupled to said second race, said spring exerting a force on said second race in a direction toward said first race.

13. The seal of claim 8 further comprising means for creating first and second fluid films at the first and second interfaces respectively to reduce friction at the interfaces.

14. The seal of claim 13 wherein said fluid film creating means comprises fluid pressure differentials across each of the interfaces.

15. The seal of claim 14 wherein said fluid pressure differentials across the interfaces are formed by:
 (a) first means adjacent said interfaces for coupling the higher pressure region with the first and second surfaces of said carrier; and
 (b) second means adjacent said interfaces for coupling the lower pressure region with the surface of said first race and the first surface of said second race.

16. In a gas turbine engine including first and second differentially rotating members coaxial with each other, a low pressure region disposed about the first and second differentially rotating members, an annular gas flowpath disposed within the first and second differentially rotating members defining a high pressure region, a method of preventing fluid leakage between the first and second rotating members, comprising the steps of:
 (a) coupling an annular carrier to the first rotating member such that the annular carrier is coaxial with the first rotating member;
 (b) sandwiching the annular carrier between a first race and a second race, and coupling the first and second races to the second rotating member; and
 (c) urging the second race toward the first race such that leakage of a fluid from the high pressure region to the low pressure region is not substantially increased by frictional wear of any of the annular carrier, the first race and the second race.

17. The method of claim 16 further comprising the step of forming first and second fluid films at the first and second interfaces, respectively, to reduce friction at the interfaces.

18. The method of claim 17 wherein forming the first and second fluid films comprises the steps of:
 (a) coupling the higher pressure region with the first and second surfaces of the annular carrier; and
 (b) coupling the lower pressure region with the surface of the first race and the first surface of the second race.

19. The method of claim 16 wherein urging the second race toward the first race comprises the steps of:
 (a) coupling a fluid from the lower pressure region to the first surface of the second race; and
 (b) coupling a fluid from the higher pressure region to a second surface of the second race which is opposite the first surface of the second race for creating a force on the second race in a direction toward the first race.

20. In a system having first and second differentially rotating members coaxial with each other, a first fluid region disposed within the first and second rotating members, and a second fluid region disposed externally of the first and second rotating members with a fluid pressure differential existing across the fluid regions whereby one of the first and second fluid regions is a higher pressure region and the other is a lower pressure region, a seal to prevent substantial fluid leakage between the first and second rotating members comprising:
 (a) an annular carrier coaxial with and coupled to the first rotating member;
 (b) first and second race means sandwiching said annular carrier and coupled to the second rotating member, a first low friction interface being defined between a surface of said first race and a first surface of said annular carrier and a second low friction interface being defined between a first surface of said second race and a second surface of said annular carrier, said annular carrier differentially rotatable with respect to said races; and
 (c) means for urging said second race toward said first race such that leakage of a fluid from the higher pressure region to the lower pressure region is not substantially increased by frictional wear of any of said annular carrier, said first race and said second race.

21. The seal of claim 20 wherein said urging means comprises a pressure differential across said second race caused by a fluid from the lower pressure region communicating with the first surface of said second race and a fluid from the higher pressure region communicating with a second surface of said second race which is opposite the first surface of said second race, whereby a force is exerted on said second race in a direction toward said first race.

22. The seal of claim 21 wherein said urging means further comprises at least one spring coupled to said second race, said spring exerting a force on said second race in a direction toward said first race.

23. The seal of claim 20 wherein said urging means comprises at least one spring coupled to said second race, said spring exerting a force on said second race in a direction toward said first race.

24. The seal of claim 20 further comprising means communicating with the first and second interfaces for creating first and second fluid films at the first and second interfaces, respectively, to reduce friction at the interfaces.

25. The seal of claim 24 wherein said fluid film creating means comprises fluid pressure differentials across each of the interfaces.

26. The seal of claim 25 wherein said fluid pressure differentials across the interfaces are formed by:
(a) first means adjacent said interfaces for coupling the higher pressure region to the first and second surfaces of said carrier; and
(b) second means adjacent said interfaces for coupling the lower pressure region to the surface of said first race and the first surface of said second race.

27. The seal of claim 20 wherein said annular carrier is coupled to the first rotating member such that the annular carrier rotates with the first rotating member and the annular carrier is axially displaceable with respect to the first rotating member when subject to axially directed forces.

28. In a system having first and second differentially rotating members coaxial with each other, a first fluid region disposed within the first and second rotating members and a second fluid region disposed externally of the first and second rotating members with a fluid pressure differential existing across the fluid regions whereby one of the first and second fluid regions is a higher pressure region, a method of preventing fluid leakage between the first and second rotating members, comprising the steps of:
(a) coupling an annular carrier to the first rotating member such that the annular carrier is coaxial with the first rotating member;
(b) sandwiching the annular carrier between a first race and a second race, and coupling the first and second races to the second rotating member; and
(c) urging the second race toward the first race such that leakage of a fluid from the higher pressure region to the lower pressure region is not substantially increased by frictional wear of any of the annular carrier, first race and second race.

29. The method of claim 28 further comprising the step of forming first and second fluid films at the first and second interfaces, respectively, to reduce friction at the interfaces.

30. The method of claim 29 wherein forming the first and second fluid films comprises the steps of:
(a) coupling the higher pressure region to the first and second surfaces of the annular carrier; and
(b) coupling the lower pressure region to the surface of the first race and the first surface of the second race.

31. The method of claim 28 wherein the step of urging the second race toward the first race comprises the steps of:
(a) coupling a fluid from the lower pressure region to the first surface of the second race; and
(b) coupling a fluid from the higher pressure region to a second surface of the second race which is opposite the first surface of the second race for creating a force on the second race in a direction toward the first race.

* * * * *